United States Patent
Beck et al.

(10) Patent No.: US 12,533,253 B2
(45) Date of Patent: Jan. 27, 2026

(54) THUMB ORTHOSIS

(71) Applicant: BAUERFEIND AG, Zeulenroda-Triebes (DE)

(72) Inventors: André Beck, Zeulenroda-Triebes (DE); Hans B. Bauerfeind, Zeulenroda-Triebes (DE)

(73) Assignee: BAUERFEIND AG, Zeulenroda-Triebes (DE)

( * ) Notice: Subject to any disclaimer, the term of this patent is extended or adjusted under 35 U.S.C. 154(b) by 572 days.

(21) Appl. No.: 17/915,541

(22) PCT Filed: Mar. 30, 2021

(86) PCT No.: PCT/EP2021/058313
§ 371 (c)(1),
(2) Date: Sep. 29, 2022

(87) PCT Pub. No.: WO2021/198266
PCT Pub. Date: Oct. 7, 2021

(65) Prior Publication Data
US 2023/0118557 A1    Apr. 20, 2023

(30) Foreign Application Priority Data
Mar. 31, 2020   (DE) ............... 10 2020 204 207.1

(51) Int. Cl.
*A61F 5/00*     (2006.01)
*A61F 5/01*     (2006.01)

(52) U.S. Cl.
CPC ...... *A61F 5/013* (2013.01); *A61F 2005/0186* (2013.01)

(58) Field of Classification Search
None
See application file for complete search history.

(56) References Cited

U.S. PATENT DOCUMENTS 5,713,837 A * 2/1998 Grim ............... A61F 5/0111
                                                    602/5
5,787,896 A    8/1998 Sackett
(Continued)

FOREIGN PATENT DOCUMENTS

CN     209122575 U      7/2019
DE     19511116 A1 *    9/1996 ............ A61F 5/0118
(Continued)

OTHER PUBLICATIONS

DE 19511116 A1 translation (Year: 1996).*
(Continued)

*Primary Examiner* — Kim M Lewis
(74) *Attorney, Agent, or Firm* — Harness, Dickey & Pierce, P.L.C.; Stephen T. Olson

(57) ABSTRACT

A thumb orthosis, particular for correcting malpositions of the thumb in the carpometacarpal joint, includes a) a substantially dimensionally stable molded body bent in a U-shape, which is fitted on the hand between the thumb and index finger in the applied state and supports the thumb and fixes it at a distance from the index finger, wherein the molded body bent in a U-shape has a first end portion and a second end portion, and b) a strap which is fastened by one strap end to the first end portion of the molded body, wherein the second end portion of the molded body has a guiding element for guiding the strap, for example has a turning element for turning the strap back.

15 Claims, 15 Drawing Sheets

(56) References Cited

U.S. PATENT DOCUMENTS

| | | | | |
|---|---|---|---|---|
| 6,325,772 | B1 * | 12/2001 | Scheuermann | A61F 5/0118 602/61 |
| 2004/0210179 | A1 | 10/2004 | Fisher | |
| 2009/0240182 | A1 | 9/2009 | Weber et al. | |
| 2012/0179081 | A1 | 7/2012 | Anglada et al. | |
| 2015/0157483 | A1 | 6/2015 | Grunden et al. | |
| 2017/0252196 | A1 | 9/2017 | Meyer | |
| 2019/0314542 | A1 * | 10/2019 | Ish Cassit | A61L 15/14 |

FOREIGN PATENT DOCUMENTS

| | | | | |
|---|---|---|---|---|
| DE | 29521749 | U1 | 6/1998 | |
| DE | 102016010135 | A1 | 2/2017 | |
| DE | 202020102689 | U1 | 10/2020 | |
| EP | 2453849 | B1 | 11/2014 | |
| EP | 3721840 | A1 * | 10/2020 | A61F 5/10 |
| FR | 2919491 | A1 | 2/2009 | |
| FR | 2948016 | A1 | 1/2011 | |
| JP | 2002-516713 | A | 6/2002 | |
| JP | 3122511 | U | 6/2006 | |
| NL | 2016047 | B1 | 3/2017 | |
| SE | 539277 | C2 * | 6/2017 | A61F 5/0118 |
| TW | M558616 | U | 4/2018 | |
| WO | 01/34070 | A1 | 5/2001 | |
| WO | WO-2013004633 | A1 * | 1/2013 | A61F 5/0104 |
| WO | WO-2013-0160478 | A1 | 10/2013 | |
| WO | 2014/151382 | A1 | 9/2014 | |
| WO | WO-2016-011999 | A1 | 1/2016 | |

OTHER PUBLICATIONS

Notch definition, Merriam-Webster https://www.merriam-webster.com/dictionary/notch (Year: 2025).*
SE 539277 C2 translation (Year: 2017).*
WO 2013004633 A1 translation (Year: 2013).*
EP 3721840 A1 translation (Year: 2020).*
Merriam-Webster Around Definition, http://www.merriam-webster.com/dictionary/around (Year: 2025).*
International Search Report (English and Deutsch) and Written Opinion of the International Searching Authority (Deutsch) issued in PCT/EP2021/058313, mailed Jul. 2, 2021; ISA/EP.
Taiwanese Office Action dated Dec. 7, 2021 (corresponding to Taiwanese Application No. 110106094).
Search Report of the Notice of Allowance issued in Chinese Application No. 20218002566783, dated Oct. 6, 2024.
Japanese Office Action dated Sep. 3, 2024 (corresponding to Japanese Application No. 2022-559346).

* cited by examiner

THUMB ORTHOSIS

CROSS REFERENCE TO RELATED APPLICATIONS

This application is a U.S. National Phase Application under 35 U.S.C. 371 of International Application No. PCT/EP2021/058313, filed on Mar. 30, 2021, which claims priority to German Patent Application No. 10 2020 204 207.1, filed on Mar. 31, 2020. The entire disclosures of the above applications are expressly incorporated by reference herein.

DESCRIPTION

The present invention relates to a thumb orthosis, in particular for correcting malpositions of the thumb in the carpometacarpal joint, comprising a) a substantially dimensionally stable molded body bent in a U-shape, which is fitted on the hand between the thumb and index finger in the applied state and supports the thumb and fixes it at a distance from the index finger, wherein the molded body bent in a U-shape has a first end portion and a second end portion, and comprising b) a strap which is fastened by one strap end to the first end portion of the molded body, wherein the second end portion of the molded body has a guiding element for guiding the strap, for example has a turning element for turning the strap back.

Rhizarthrosis is an arthrosis of the thumb carpometacarpal joint. The articular cartilage is thereby worn away, leading to a painful rubbing of the joint surfaces against one another. Typical symptoms are pain and muscle weakness in the thumb. The thumb carpometacarpal joint is one of the smallest but most stressed joints of the body. The carpometacarpal joint connects the first metacarpal and the greater trapezoid bone (Os trapezium) of the carpal bones. Due to its particular shape, it gives the thumb great mobility and thus makes gripping and holding possible.

Special wrist braces can immobilize and relieve the affected joint. WO 2016/011999 A1 discloses a dynamic orthosis in which the bones of the thumb carpometacarpal joint are pulled apart upon movement, and thus the painful rubbing should be avoided. Further thumb orthoses are known from DE 295 21 749 U1, WO 2013/160478 A1, FR 2919491 A1, and EP 2 453 849 B1.

Given thumb orthoses from the prior art, however, a repositioning of the metacarpal of the thumb is not possible. Rather, the thumb is pulled away from the index finger by these orthoses and fixed in a position opposite the palm of the hand.

The problem to be solved by the present invention is that of providing an improved thumb orthosis, in particular a thumb orthosis which permits a good repositioning of the metacarpal of the thumb relative to the carpal bone, especially even permanently, and via which the metacarpal is permanently slightly raised relative to the carpal bone.

The present invention solves the technical problem via a new thumb orthosis.

The present invention solves the technical problem via a thumb orthosis, in particular for correcting malpositions of the thumb in the carpometacarpal joint, comprising a) a substantially dimensionally stable molded body bent in a U-shape, which is fitted on the hand in the applied state, between the thumb and index finger, and supports the thumb and fixes it at a distance from the index finger, wherein the molded body bent in a U-shape has a first end portion and a second end portion, and comprising b) a strap which is fastened by one strap end to the first end portion of the molded body, wherein the second end portion of the molded body has a guiding element for guiding the strap; wherein the strap, as viewed from the first end portion in the applied state, is guided once around the wrist such that it overlaps itself at an overlap point; wherein the two mutually overlapping strap portions are not rigidly connected to one another at the overlap point, and the strap is guided on the guiding element of the second end portion, and the end of the strap may be reversibly fastened to the strap.

The guiding element serves to guide the strap, wherein in particular a directional change of the strap, i.e. a bending of the strap until it reverses direction, may thereby be effected. At the overlap point, a partial region of the strap rests on another partial region of the strap, wherein the partial regions may, for example, intersect or run in parallel atop one another.

The present invention solves the technical problem via a thumb orthosis, in particular for correcting malpositions of the thumb in the carpometacarpal joint, comprising a) a substantially dimensionally stable molded body bent in a U-shape, which is fitted on the hand between the thumb and index finger in the applied state and supports the thumb and fixes it at a distance from the index finger, wherein the molded body bent in a U-shape has a first end portion and a second end portion, and comprising b) a strap which is fastened by one strap end to the first end portion of the molded body, wherein the second end portion of the molded body comprises a turning element for turning the strap back; wherein the strap, as viewed from the first end portion in the applied state, is guided once around the wrist such that it intersects with itself at an intersection point; wherein the two intersecting strap portions are not rigidly connected to one another at the intersection point, and the strap is turned back at the turning element of the second end portion, and the end of the strap may be reversibly fastened to the strap.

The guiding element thus serves in particular to change the direction of the strap. The guiding element is therefore designed in particular as a direction changing element.

In particular, it can be provided that the change in direction brought about the guiding element is a curvature of the strap profile.

In a preferred embodiment, the guiding element for guiding the strap is therefore a turning element for turning the strap back. The change in direction of the strap is therefore a reversal of direction. In a preferred embodiment, the overlap point is therefore an intersection point, and the two overlapping strap portions are two intersecting strap portions.

The thumb orthosis according to the invention advantageously leads to a repositioning of the thumb in which the thumb is pulled into the plane of the palm. The more tension that is introduced into the strap, the further the thumb is advantageously positioned in the direction of the palm plane, which surprisingly leads to a pain-relieving positioning of the thumb.

The embodiment according to the invention of the overlapping, in particular intersecting, strap portions, in which the two overlapping, in particular intersecting, strap portions are not fixedly connected to one another at the overlap point, in particular intersection point, leads to an advantageous dynamic overlap point, in particular intersection point. Thus, the position of the overlap point, in particular intersection point, is not predefined and fixed but rather dynamic, and can adapt to the corresponding hand and thumb size. Thus, the desired repositioning of the thumb, in particular into a position in the plane of the palm, and the lifting of the metacarpal relative to the carpal bone, is advantageously possible. Given a dynamic overlap point, the two overlapping strap regions can advantageously slip relative to one another.

In the context of the present invention, a person skilled in the art will clearly understand an intersection point to be the surface at which the two intersecting strap portions overlap. Thus, the intersection point can also be understood as a planar intersection point or intersection face.

In a preferred embodiment, the overlap point, in particular intersection point, lies in a defined overlap region, in particular intersection region.

In a preferred embodiment, the overlap point, in particular intersection point, is positioned on the strap such that it is approximately 1.5 to 3 cm away from the strap end fastened to the first end portion of the molded body.

In a preferred embodiment, the overlap region, in particular the intersection region, of the strap is designed such that the two overlapping or intersecting strap portions are mounted such that they can slip counter to one another. The overlap region, in particular intersection region, can in particular be designed such that the two overlapping or intersecting strap portions can slip counter to one another only in the overlap region, in particular intersection region.

In a preferred embodiment, the overlap region, in particular intersection region, of the strap is designed such that one of the two overlapping, in particular intersecting, strap portions has a guide for the other of the two overlapping, in particular intersecting, strap portions. Preferably, the guide is designed in such a way that the guided strap portion is mounted so that it can slip along and transverse to the strap portion having the guide.

Such a guide advantageously allows the flexibility, according to the invention, of the overlap point, in particular intersection point, of the two strap portions, but at the same time ensures that the overlap point, in particular intersection point, is only displaceable to the extent that the desired repositioning occurs. This prevents an undesired slippage of the strap when wearing the thumb orthosis.

In a preferred embodiment, the overlap region, in particular intersection region, is formed as a loop on or in the strap, through which the strap can be pulled, wherein the loop is arranged in the region of the strap which follows the first end portion of the molded body. A loop as a guide is thin and allows for slippage of the guided strap portion in a simple manner.

In a preferred embodiment, the loop forms a slot that is wider than the width of the strap.

Preferably, the guide, in particular the loop, therefore has a length that is greater than the width of the strap in the guided strap portion, so that the guided strap portion can slip in the loop. Preferably, the guide, in particular the loop, has a length of at least 1.2 times the width of the guided strap portion, particularly preferably of at least 1.5 times the width of the guided strap portion. Preferably, the guide, in particular the loop, has a length of at most 3 times the width of the guided strap portion, particularly preferably of at most 2 times the width of the guided strap portion. Preferably, the guide, in particular the loop, has a length of at least 1.2 times and at most 3 times the width of the guided strap portion, particularly preferably of at least 1.5 times and at most 2 times the width of the guided strap portion.

The base strap lying under the loop of the strap is preferably designed as a solid material so that no window edema can form on the covered tissue. Preferably, therefore, the base strap is uniformly continuous at this point and the loop is placed on it or attached to it, and not constructed as a notch of the base strap.

In an alternative embodiment, the overlap region, in particular intersection region, is designed as a hook-and-loop fastener. This also allows a dynamic positioning of the overlap point, in particular intersection point.

In a preferred embodiment, the end of the strap can be reversibly fastened to the strap via a pin closure, via a hook-and-loop fastener, or via a hook/eye closure. In a preferred embodiment, the end of the strap has a pin closure, a hook-and-loop fastener, or a hook/eye closure on the strap, with which it can be reversibly fastened to the strap. In a preferred embodiment, the end of the strap has on the strap a pin, a hook-and-loop or fleece surface, or a hook or an eyelet, with which it can be reversibly fastened to the strap.

In a preferred embodiment, the molded body and the strap are formed in one piece.

In a preferred embodiment, the guiding element is formed on the second end portion of the molded body as a loop, or is formed as at least one notch in the second end portion, or is designed as a perforated strap.

In a preferred embodiment, the guiding element is formed on the second end portion of the molded body as a loop, or as two notches in the second end portion.

In a preferred embodiment, the turning element is formed on the second end portion of the molded body as a notch in the second end portion.

In a preferred embodiment, the guiding element can be fastened to the strap via a fixing element. In a preferred embodiment, the guiding element can be fastened to the holes of the strap via a fixing element.

In a preferred embodiment, the guiding element can be reversibly fastened to the strap via a fixing element. In a preferred embodiment, the guiding element can be reversibly fastened to the holes of the strap via a fixing element.

In a preferred embodiment, the guiding element can be reversibly fastened to the strap via a pin closure, via a hook-and-loop fastener, or via a hook/eye closure.

In a preferred embodiment, the guiding element is designed as a perforated strap with which is preferably associated a fixing element, for example a pin closure, for fixing at least one of the holes of the perforated strap to the strap, in particular to at least one of the holes of the strap. In a preferred embodiment, the guiding element is thus designed as a perforated strap and fixing element. The fixing element, for example a pin closure, can connect one of the holes of the guiding element to one of the holes of the strap such that the direction of the strap can be guided differently depending on the selected hole of the guiding element in combination with the selected hole of the strap. This embodiment advantageously allows for a more specific adaptation of the desired guidance of the strap.

In a preferred embodiment, the molded body is saddle-shaped.

In a preferred embodiment, the molded body has air holes. This allows a ventilation and removal of moisture in the carpometacarpal region covered by the molded body.

In a preferred embodiment, the molded body consists of an integrally shapeable material. Thus, if desired or necessary, the molded body can be adapted to the exact anatomy of the patient's hand.

In a particularly preferred embodiment, the thumb orthosis is designed with the features shown in FIGS. 1, 3, 4, and 6, in particular of the embodiment of the loop shown there. Preferably, the loop is not formed on the strap as a loop for fixing a wristband closure, i.e. transverse to the strap, but rather along the strap, whereby in particular an intersection region can be formed.

Preferably, the loop travels approximately longitudinally relative to the strap. Preferably, the loop travels on the strap such that an intersection region can be formed. Preferably, the loop travels longitudinally relative to the strap. Preferably, the loop does not travel transverse to the strap.

Further preferred embodiments result from the dependent claims.

The invention is explained in more detail using the exemplary embodiment of FIGS. 1 to 14, without this exemplary embodiment being understood as limiting.

Figure 1:
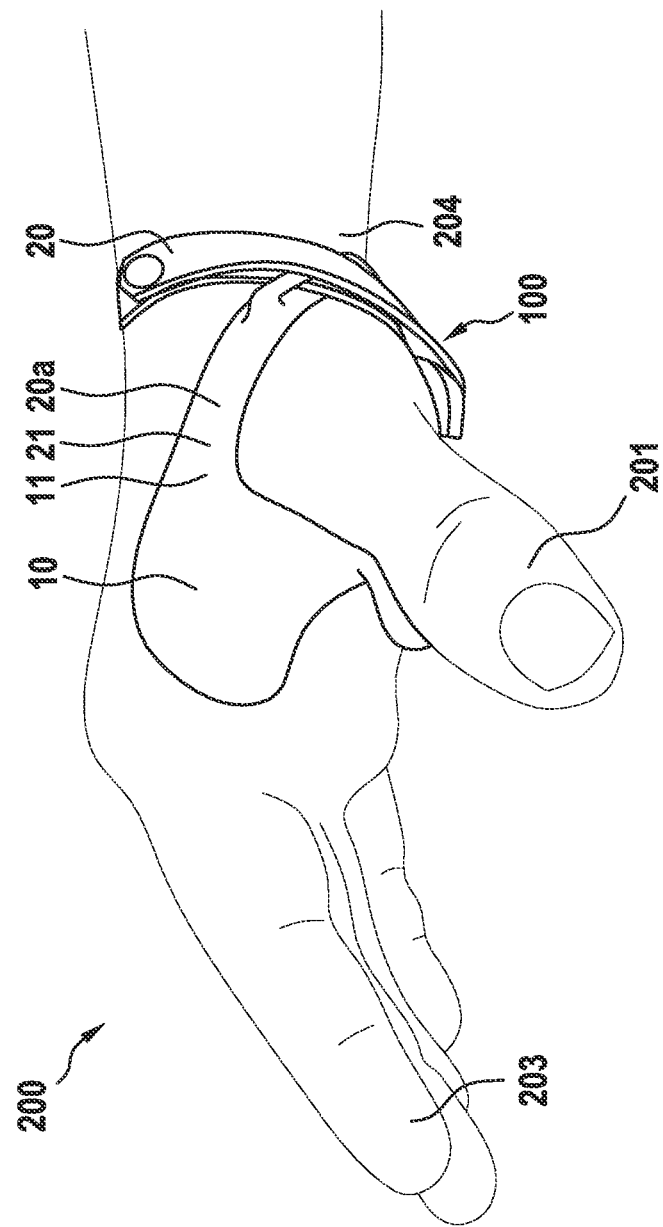
FIG. 1 shows a first embodiment of the thumb orthosis according to the invention on a hand.

FIG. 1 shows a preferred embodiment of a thumb orthosis (100) according to the invention on a right hand (200) of a patient. The person skilled in the art can readily produce a corresponding thumb orthosis for a left hand. The thumb orthosis (100) has a molded body (10) bent in a U-shape, which rests on the hand (200) in a saddle shape between thumb (201) and index finger (203). The molded body (10) bent in a U-shape has a first end portion (11) which, in the tightened state, is located on the outer surface of the hand (200). A strap (20) is fastened to said first end portion (11) by its first strap end (21) of the first strap portion (20*a*). The strap (20) travels around the wrist (204) so as to intersect with itself. The exact course of the strap (20) can be seen in FIGS. 2 and 3.

Figure 2:
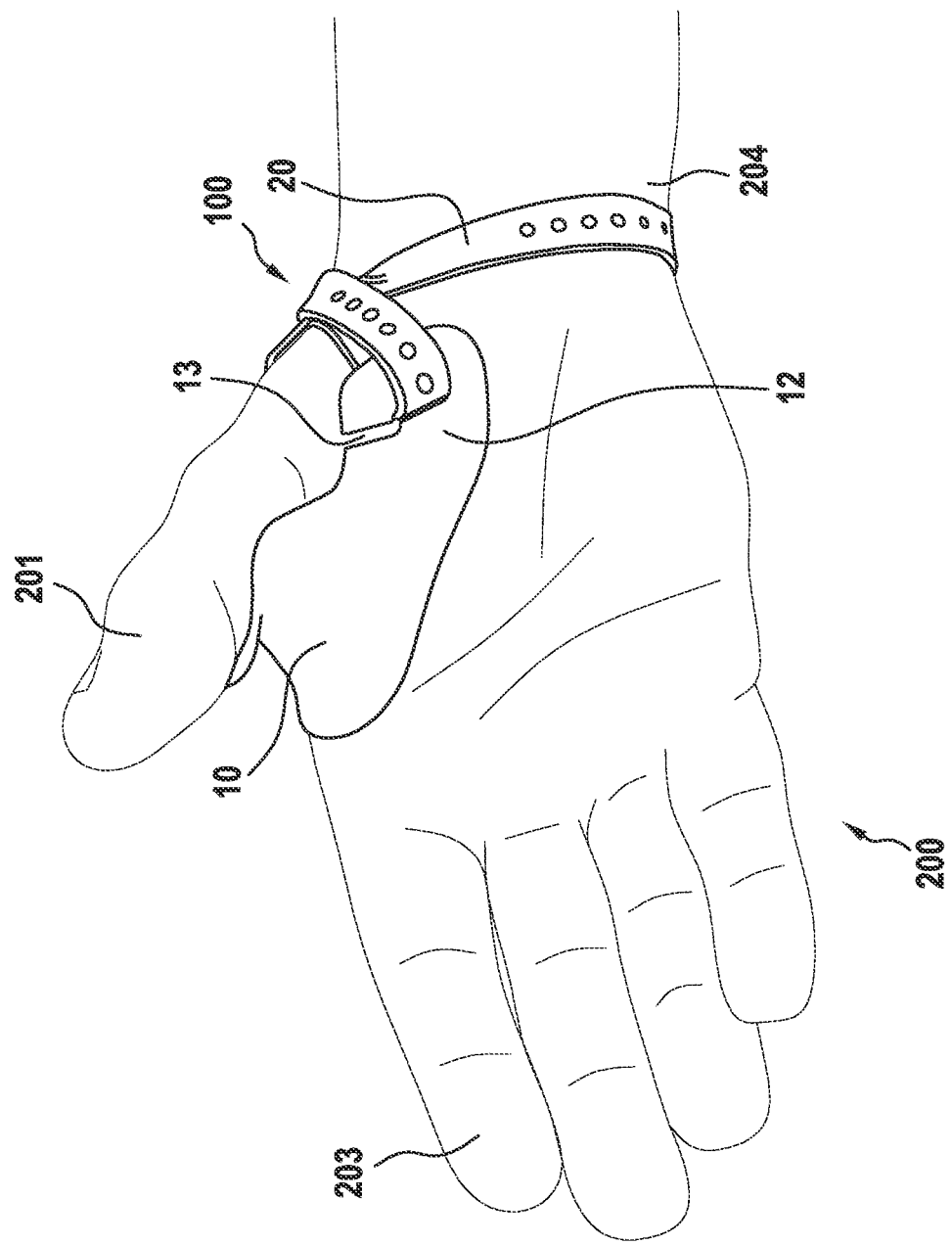
FIG. 2 shows the thumb orthosis from FIG. 1 from a different perspective.

FIG. 2 shows the thumb orthosis (100) from FIG. 1 from a different perspective. The hand (200) on which the molded body (10), bent in a U-shape, rests between thumb (201) and index finger (203), can again be seen. Said molded body has, on the palm of the hand, a second end portion (12) with a turning element (13) designed as a slot. The strap (20), traveling around the wrist (204) in an intersecting manner, is turned in the turning element (13).

Figure 3:
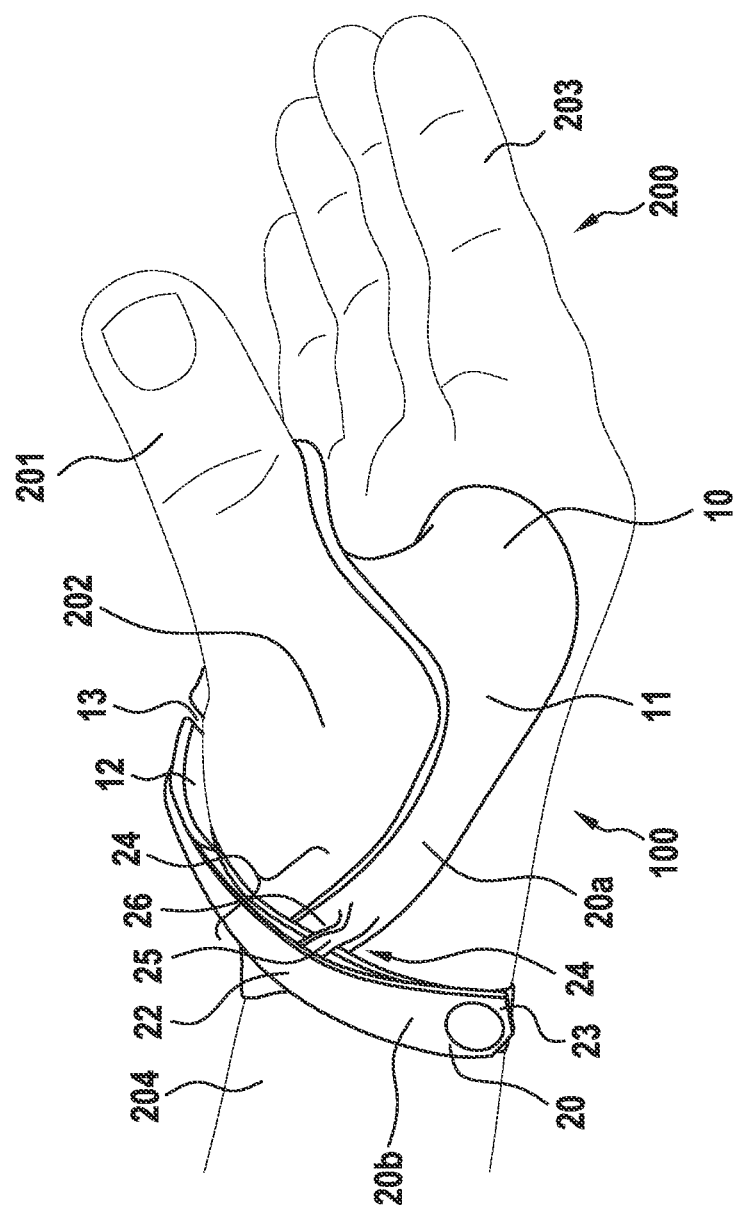
FIG. 3 shows the thumb orthosis from FIG. 1 from a different perspective.

FIG. 3 shows the thumb orthosis (100) from FIG. 1 from a third perspective. The hand (200) on which the molded body (10), bent in a U-shape, rests between thumb (201) and index finger (203) can again be seen. At the first end portion (11), the strap (20) begins to travel around the wrist (204). In the first strap portion (20*a*), it has an intersection region (24) formed as a loop (25). The strap (20) travels around the wrist (204) and crosses in the intersection region (24) in that it is guided through the slot (26) formed by the loop (25), resulting in an intersection point (22). The strap (20) then travels to the second end portion (12) of the molded body (10) and is turned there at the turning element (13). For tightening the strap (20), the second strap portion (20*b*) thereof rests, up to its second strap end (23), on the first strap portion (20*a*), and is reversibly connected thereto via a pin closure (not visible).

The intersection point (22) thereby lies between the radial head and the thumb carpometacarpal joint (202) of the hand (200).

The thumb orthosis (100) shown in FIGS. 1 to 3 advantageously results in repositioning of the thumb (201) taking place, in that the strap (20) dynamically intersects in the intersection region (24), in which repositioning the thumb (201) does not lie opposite the palm of the hand, as can be seen in particular in FIG. 2, but rather lies in the plane of the remainder of the hand (200). In addition, the metacarpal is advantageously raised slightly relative to the carpal bone. The thumb (201) is thus pulled dorsally, and at the same time abducted, by tightening the strap (20). At the same time, the intersecting strap (20) fixes the thumb orthosis (100) on the wrist. Advantageously, only the one strap (20) must be tightened for the thumb orthosis (100) to function fully.

Figure 4:
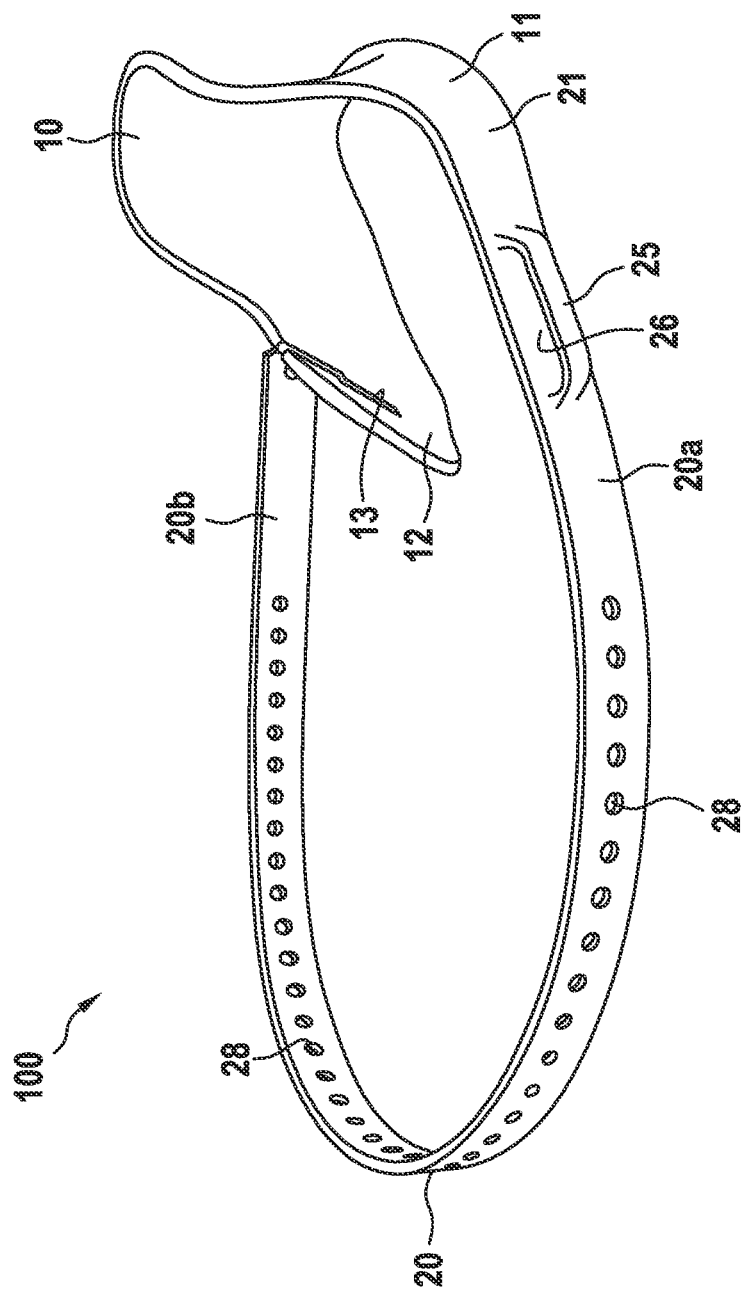
FIG. 4 shows the thumb orthosis from FIG. 1 in the non-applied state.
Figure 5:
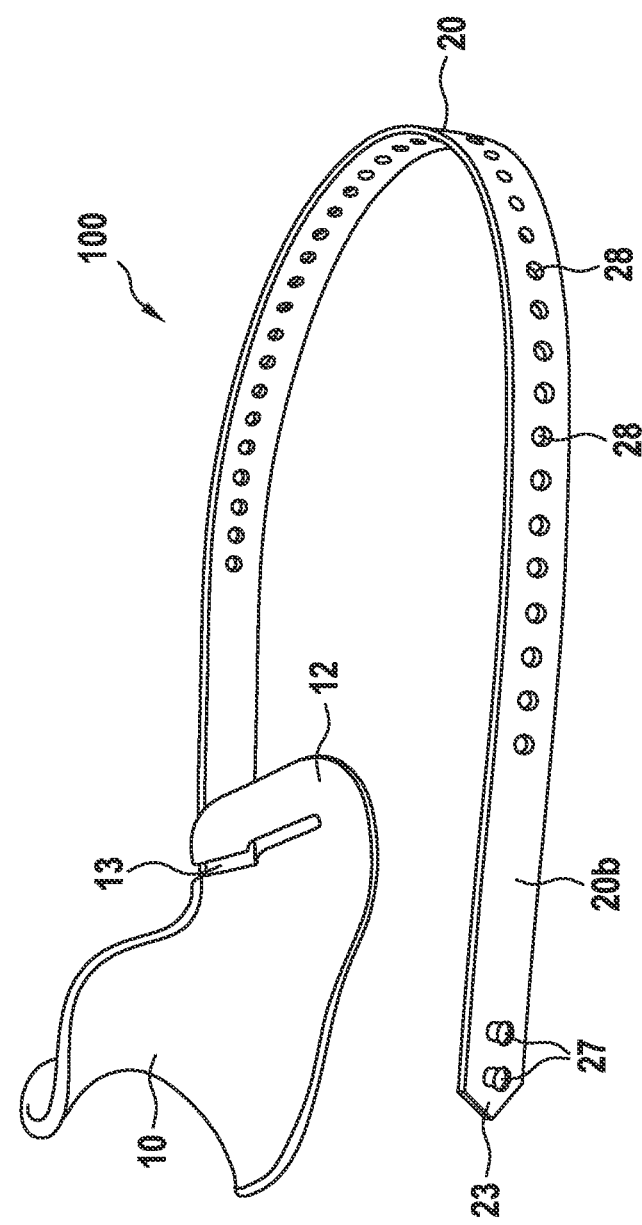
FIG. 5 shows the thumb orthosis from FIG. 4 from a different perspective.

FIGS. 4 and 5 show the thumb orthosis (100) without a hand. The molded body (10), bent in a U-shape or saddle-shape, with the first end portion (11) and the second end portion (12) is visible. The first strap portion (20*a*) of the strap (20) is fastened by its first strap end (21) to the first end portion (11). The first strap portion (20*a*) has a loop (25) through whose slot (26), which is wider than the strap (20), the strap (20) can be guided dynamically and movably. The loop (25) travels along the strap (20) and not transversely, as a conventional loop for fixing a strap such as a watch strap would travel. The strap (20) has holes (28) of a pin closure into which two pins (27) on the second strap portion (20*b*) can be inserted at the second strap end (23) to close the strap (20), after the strap (20) has been turned by the turning element (13) of the second end portion (12) of the molded body (10), designed as a slot, and thus can be tightened.

Figure 6:
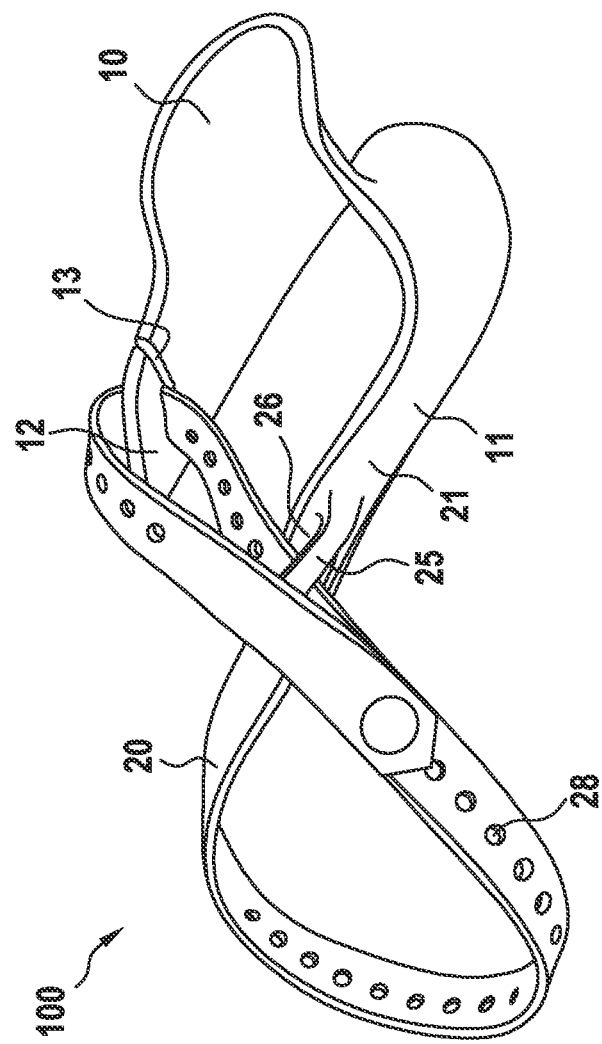
FIG. 6 shows the thumb orthosis from FIG. 4 with crossed strap.
Figure 7:
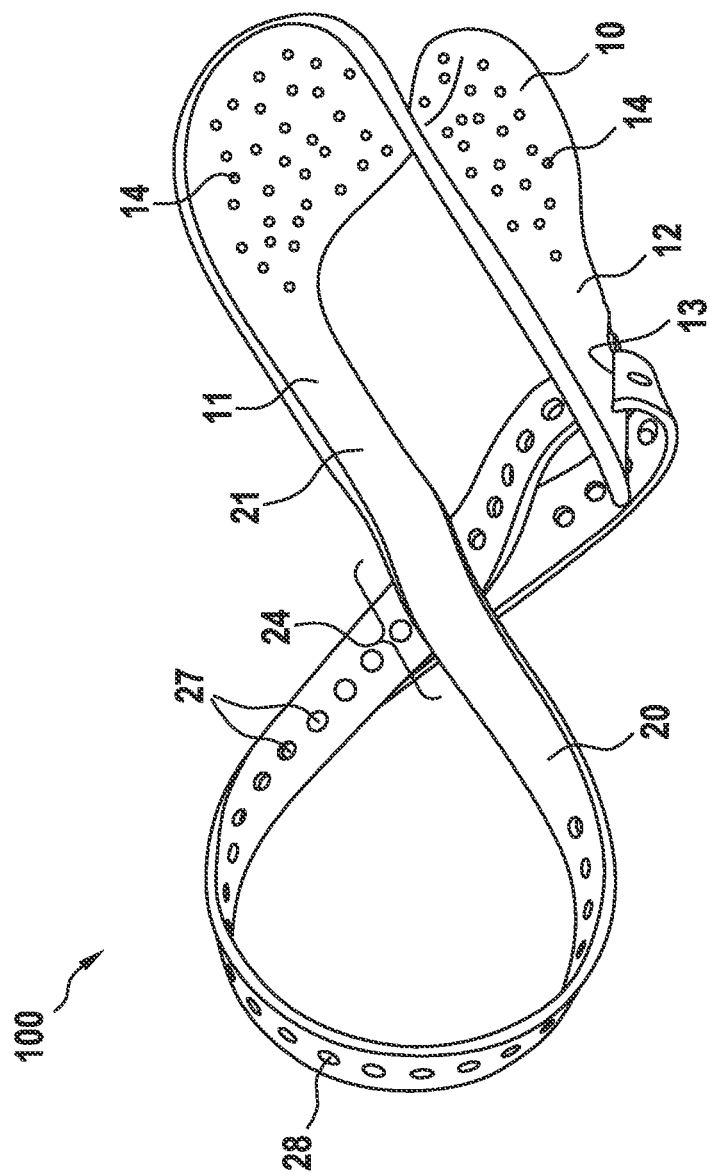
FIG. 7 shows the thumb orthosis from FIG. 6 from a different perspective.

FIGS. 6 and 7 show the thumb orthosis (100) from FIGS. 4 and 5 with the intersecting course of the strap (20). The strap (20) begins at the first strap end (21) on the first end portion (11) of the U-shaped molded body (10) and forms a loop. Then, the strap (20) crosses over itself in the intersection region (24) in that it is guided through the slot (26) of the loop (25). The strap (20) is then turned by the turning element (13) at the second end portion (12) of the U-shaped molded body (10), and is fastened to itself tightly and such that it can be released again, via the pin closure consisting of pins (27) and holes (28). Via the plurality of holes (28), a fastening that is adapted to the wrist diameter is thereby possible.

Moreover, in FIG. 7 further preferred air holes (14) which allow ventilation of the palm lying under the molded body (10) are also visible in said molded body (10).

Figure 8:
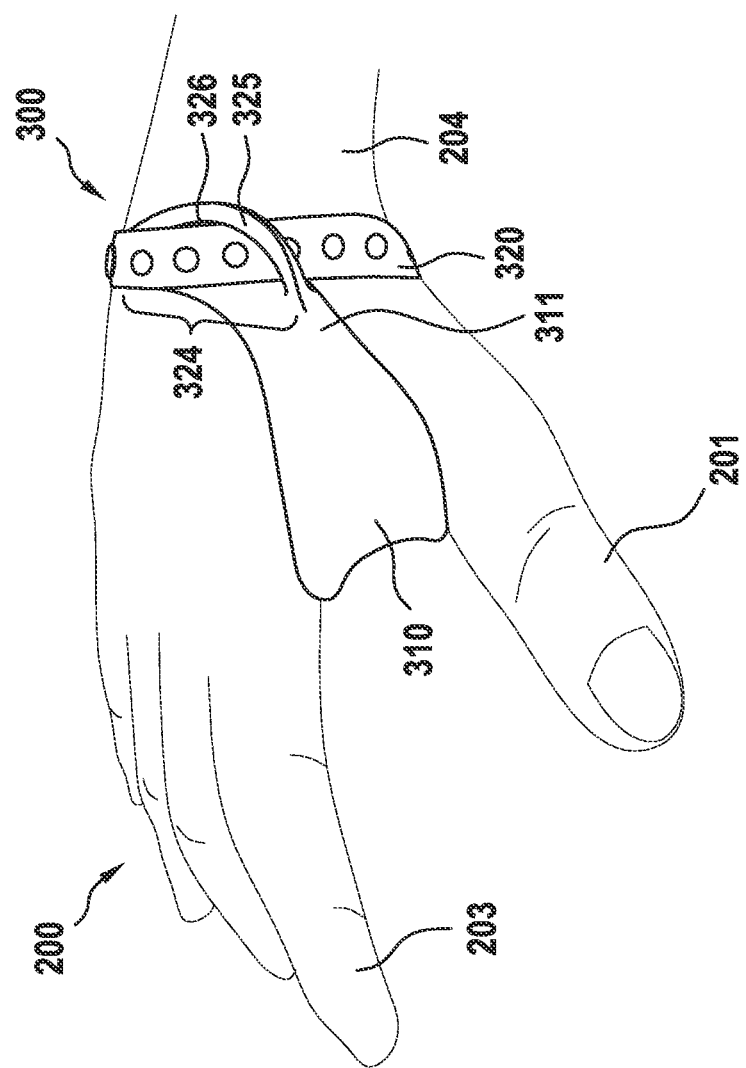
FIG. 8 shows a second embodiment of the thumb orthosis according to the invention on a hand.

FIG. 8 shows an alternative embodiment (300) of a thumb orthosis according to the invention, here again on a right hand (200) with thumb (201), index finger (203), and wrist (204). For this embodiment of the thumb orthosis (300), too, the person skilled in the art can readily provide a corresponding thumb orthosis for a left hand. The thumb orthosis (300) has a molded body (310), bent in a U-shape, which rests on the hand (200) in a saddle shape between the thumb (201) and index finger (203). The molded body (310), bent in a U-shape, has a first end portion (311) which, in the tightened state, is located on the outer surface of the hand (200). A strap (320) is fastened by its first strap end (not visible here) of the first strap portion to said first end portion (311). The strap (320) travels around the wrist (204) in a partially overlapping manner. A slot (326) formed by a loop (325) is thereby guided, as a guiding element of the strap (320), so that an overlap region or overlap point (324) results. The exact course of the strap (320) can be seen in FIGS. 9 and 10.

Figure 9:
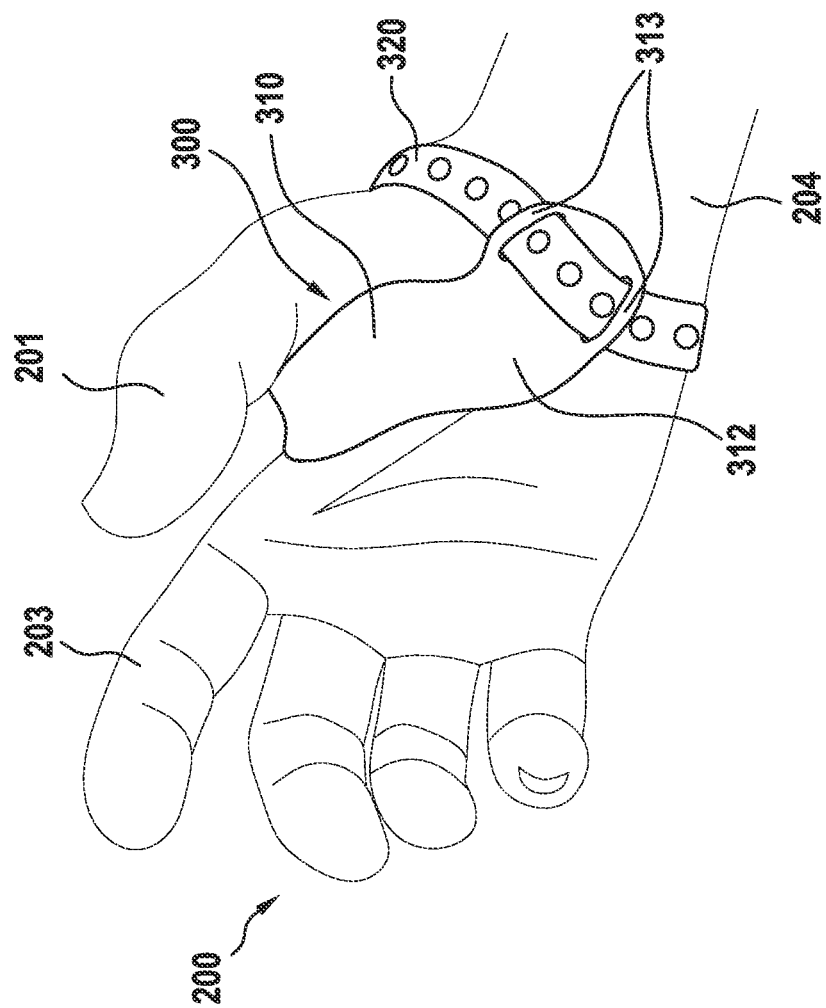
FIG. 9 shows the thumb orthosis from FIG. 8 from a different perspective.

FIG. 9 shows the thumb orthosis (300) from FIG. 8 from a different perspective. The hand (200), on which the molded body (310), bent in a U-shape, rests between the thumb (201) and index finger (203), can again be seen. Said molded body has a second end portion (312) on the palm of the hand, with a guiding element (313) designed as two loops. The strap (320), traveling around the wrist (204) in an overlapping manner, is turned in the guiding element (313).

Figure 10:
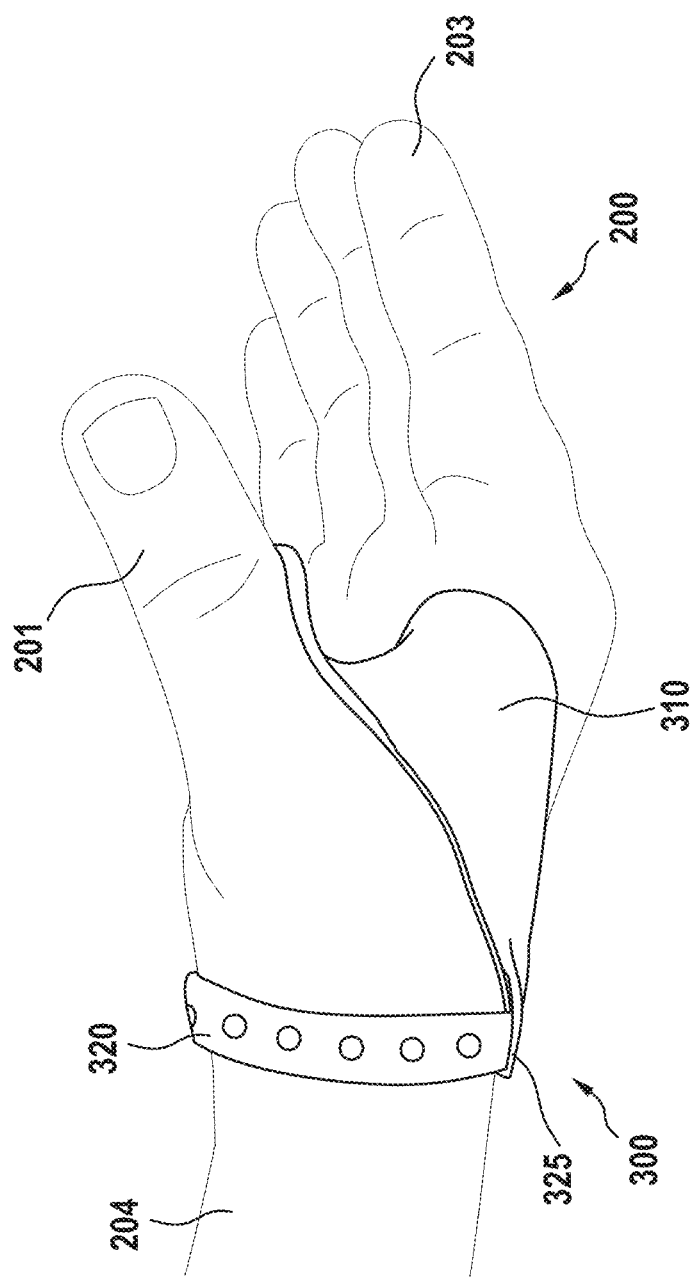
FIG. 10 shows the thumb orthosis from FIG. 8 from a different perspective.

FIG. 10 shows the thumb orthosis (300) from FIG. 8 from a third perspective. The hand (200), on which the molded body (310), bent in a U-shape, rests between the thumb (201) and index finger (203), can again be seen. In the region of the wrist (204), the strap (320) is guided through a loop (325), whereby the strap (320) forms an overlap region.

The thumb orthosis (300) shown in the embodiment of FIGS. 8 to 10 also advantageously results in a repositioning of the thumb (201) taking place, in that the strap (320) overlaps dynamically in the overlap region (324), in which repositioning the thumb (201), as visible in particular in FIG. 9, does not lie opposite the palm but rather in the plane of the remainder of the hand (200). Moreover, here as well the metacarpal is advantageously slightly raised relative to the carpal bone. The thumb (201) is thus likewise pulled dorsally, and at the same time abducted, by tightening the strap (320). At the same time, the overlapping strap (320) fixes the thumb orthosis (300) on the wrist (204). Here as well, advantageously only the one strap (320) must be tightened for the full function of the thumb orthosis (300), wherein the handling in this embodiment is even simpler than in the alternative embodiment according to FIGS. 1 to 7.

Figure 11:
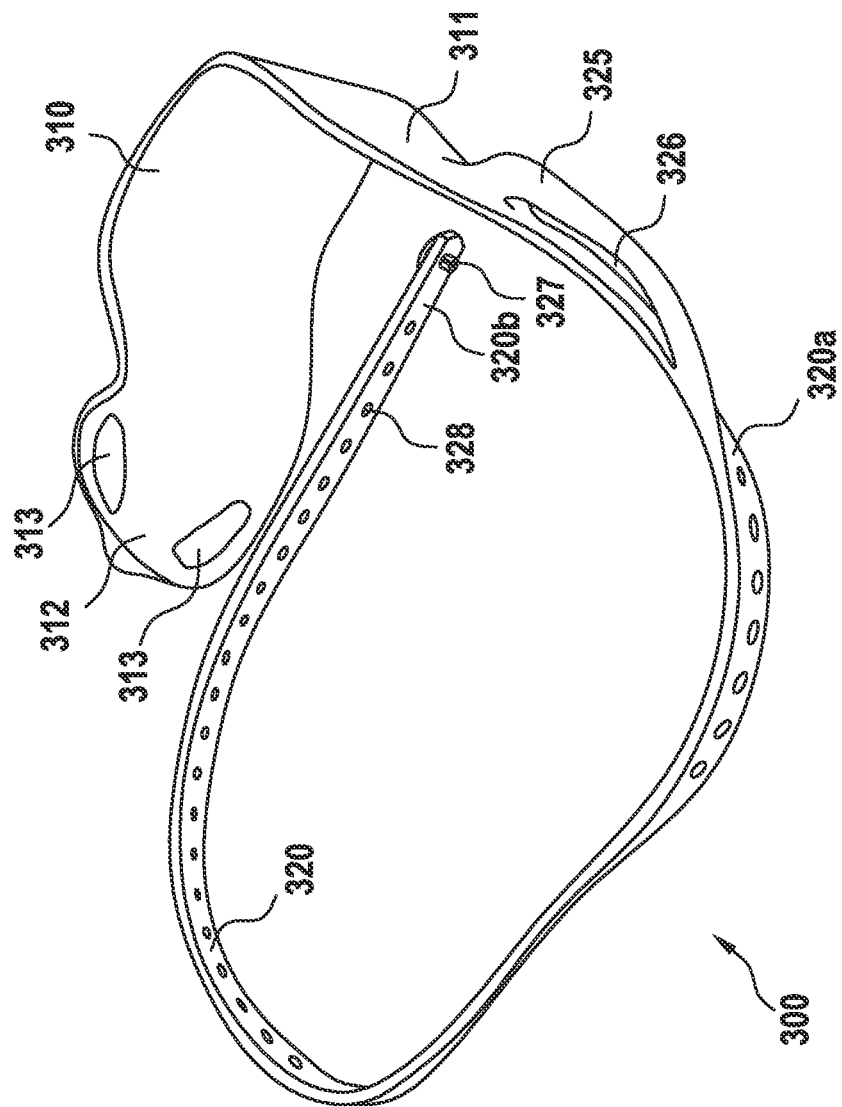
FIG. 11 shows the thumb orthosis from FIG. 8 in a non-applied state.
Figure 12:
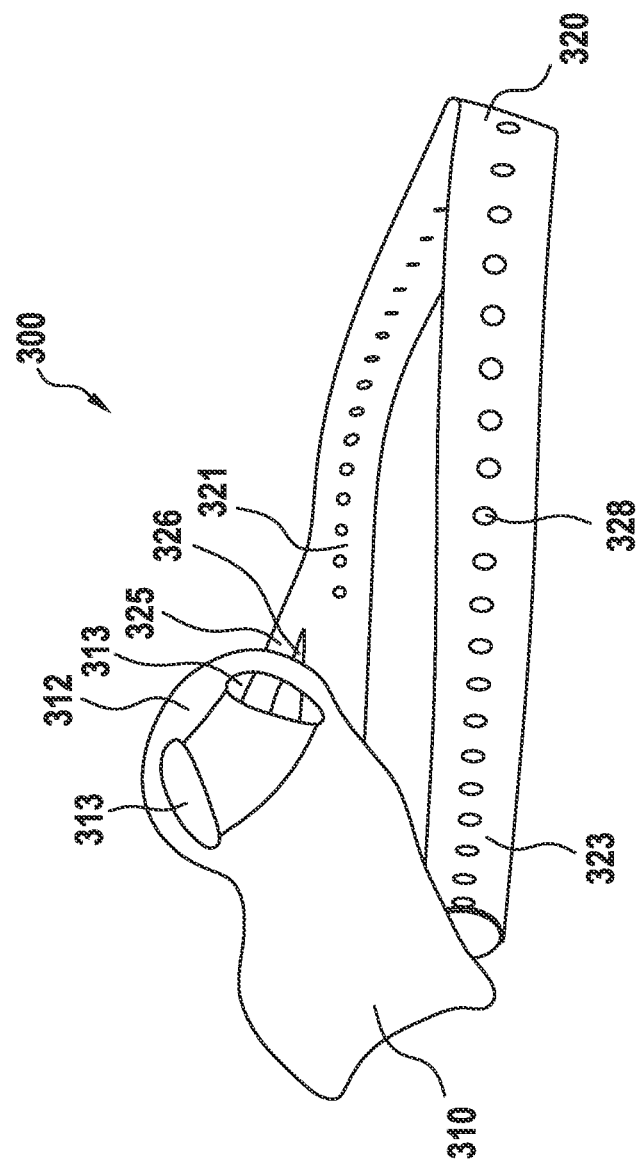
FIG. 12 shows the thumb orthosis from FIG. 11 from a different perspective.

FIGS. 11 and 12 show the thumb orthosis (300) without a hand. The molded body (310), bent in a U-shape or saddle-shape, with the first end portion (311) and the second end portion (312) is visible. The first strap portion (320a) of the strap (320) is fastened by its first strap end (321) to the first end portion (311). The first strap portion (320a) has a loop (325) through whose slot (326), which is wider than the strap (320), the strap (320) can be guided dynamically and movably. The strap (320) comprises holes (328) of a pin closure, into which it is possible to insert a pin (327) on the second strap portion (320b), at the second strap end (323), to close the strap (320) after the strap (320) has been guided through the guiding element (313) of the second end portion (312) of the molded body (310), which guiding element is designed as two loops with slots, and can thus be tightened.

Figure 13:
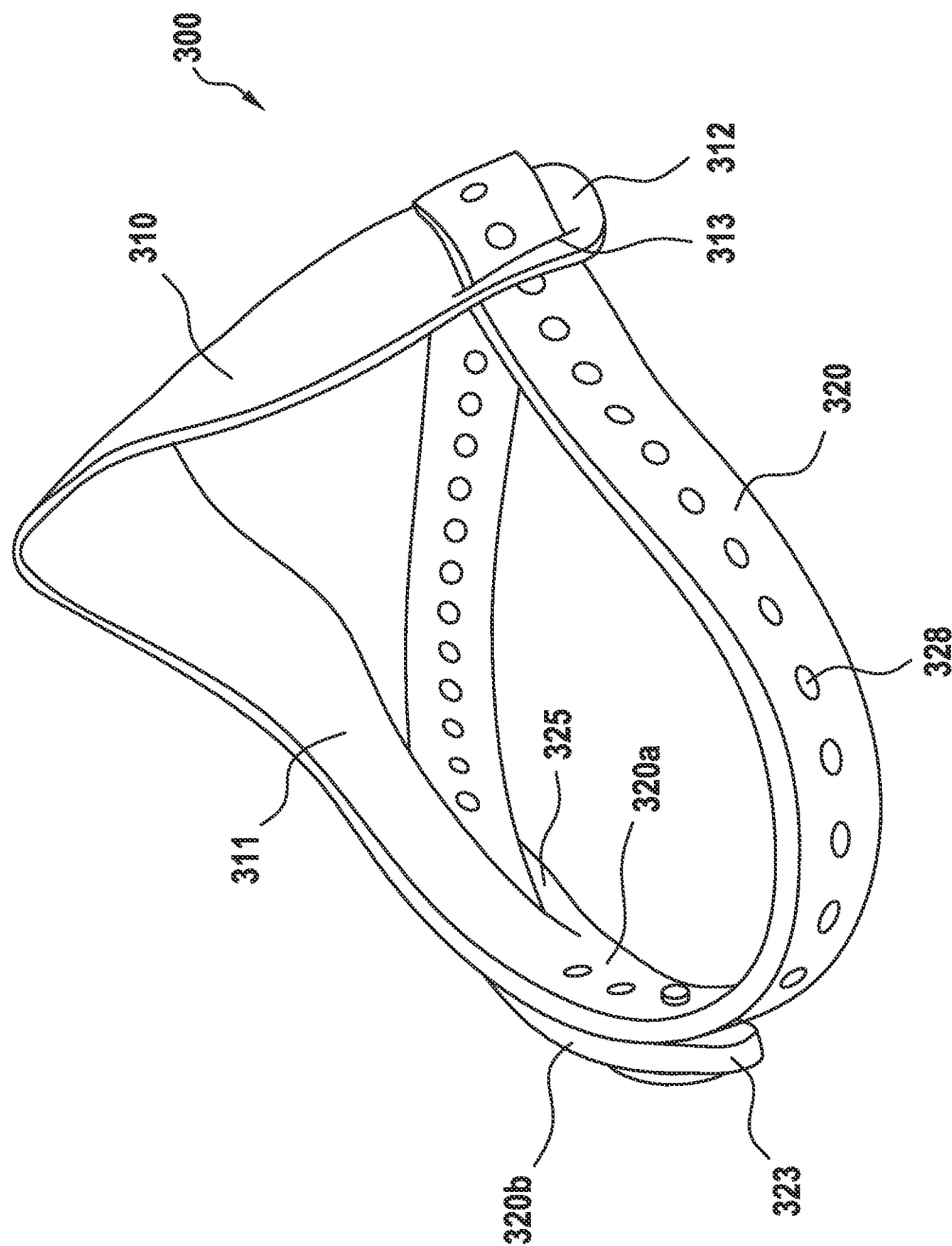
FIG. 13 shows the thumb orthosis from FIG. 11 with overlapping strap.
Figure 14:
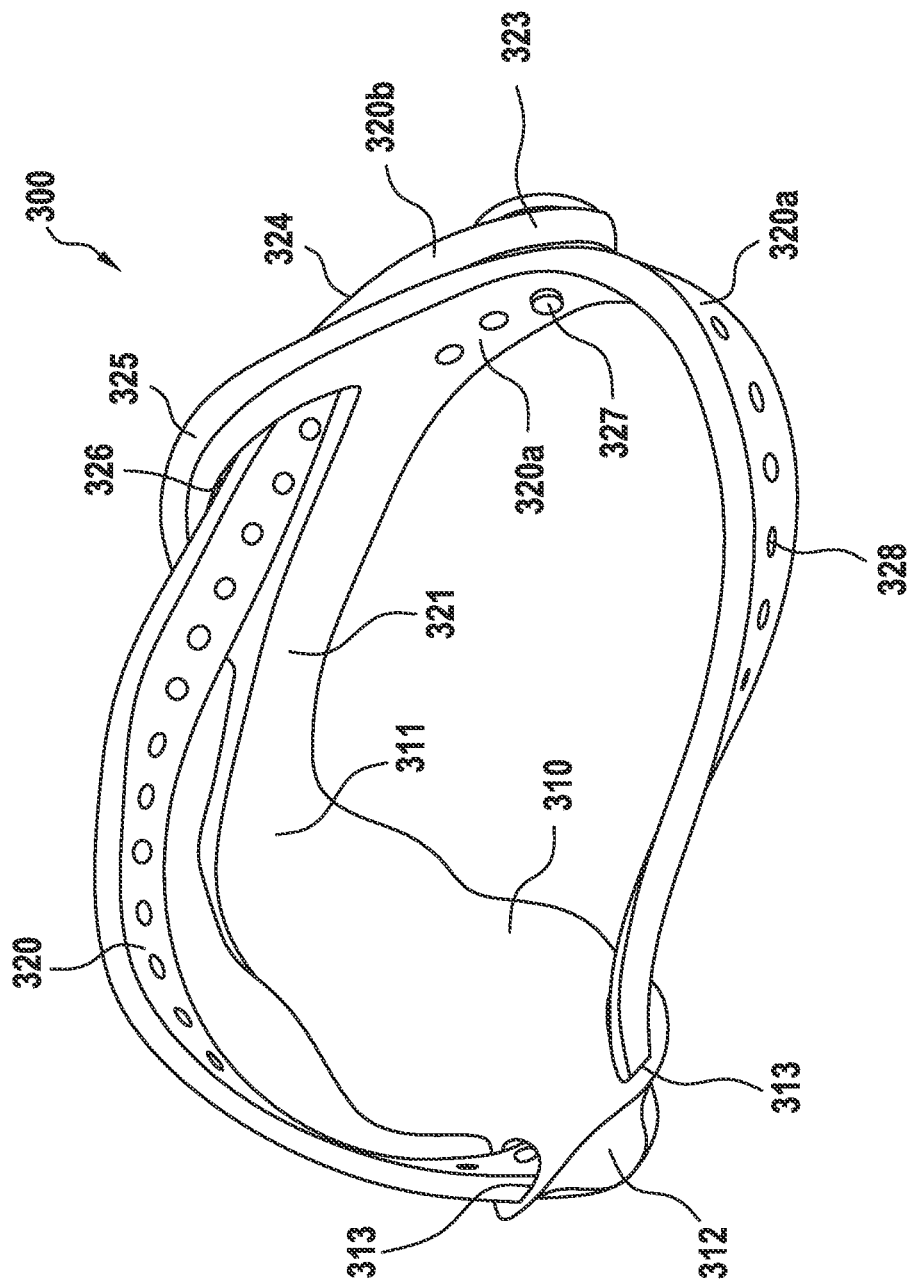
FIG. 14 shows the thumb orthosis from FIG. 13 from a different perspective.

FIGS. 13 and 14 show the thumb orthosis (300) from FIGS. 11 and 12 with the overlapping course (324) of the strap (320). The strap (320) begins at the first strap end (321) at the first end portion (311) of the U-shaped molded body (310) and forms a loop. Then, the strap (320) overlaps itself in the overlap region (324) in that it is guided through the slot (326) of the loop (325). The strap (320) is guided, at the second end portion (312) of the U-shaped molded body (310), via the guiding element (313), and is fastened to itself, tightly and such that it can be released again, in the overlap region (324) via the pin closure consisting of a pin (327) and holes (328). A fastening adapted to the wrist thickness is thereby possible via the plurality of holes (328). The pin (327) is thereby located in the second strap portion (320b), i.e. in the region of the second strap end (323). The first strap portion (320a) thus overlaps here with the second strap portion (320b).

Figure 15:
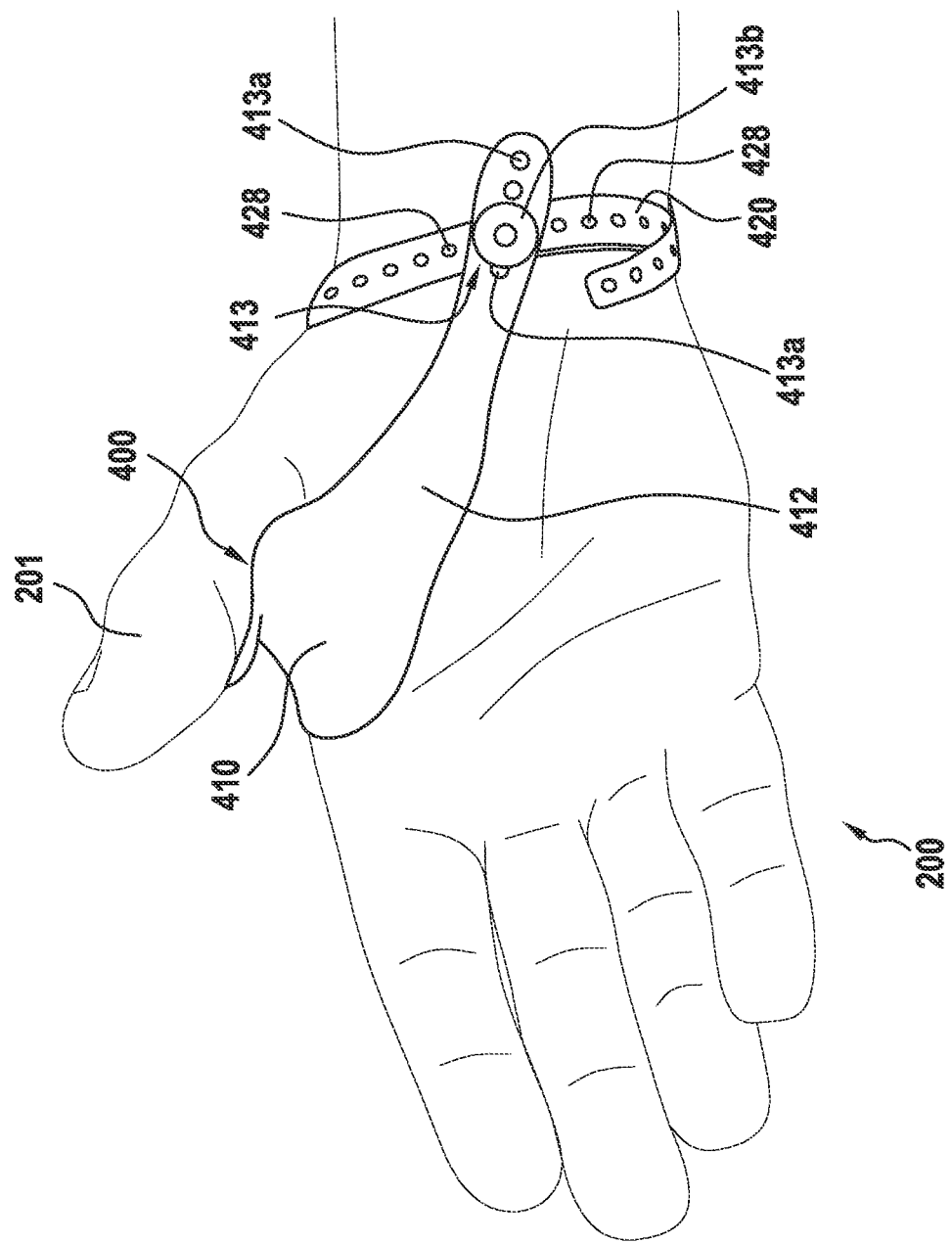
FIG. 15 shows a further embodiment of the guiding element of a thumb orthosis according to the invention.

FIG. 15 shows a further thumb orthosis (400) on a right hand (200) with thumb (201), in which the molded body (410) with the second end portion (412) follows an alternative embodiment of the guiding element (413). Here, the guiding element (413) consists of a perforated strap with holes (413a) with which a pin closure (413b) is associated. The pin closure (413b) can reversibly connect one of the holes (413a) of the guiding element (413) to one of the holes (428) of the strap (420), such that the direction curve of the strap (420) can be guided differently depending on the selected hole (413a) of the guiding element (413) in combination with the selected hole (428) of the strap (420). This embodiment advantageously enables a more specific adaptation of the desired guidance of the strap (420).

LIST OF REFERENCE SIGNS 10 molded body bent in a U-shape
11 first end portion
12 second end portion
13 turning element
14 air holes
20 strap
20a first strap portion
20b second strap portion
21 first strap end
22 intersection point
23 second strap end
24 intersection region
25 loop in the intersection region
26 slot
27 pin of a pin closure
28 hole of a pin closure
100 thumb orthosis
200 hand
201 thumb
202 carpometacarpal joint
203 index finger
204 wrist
300 thumb orthosis
310 molded body
311 first end portion
312 second end portion
313 guiding element
320 strap
320a first strap portion
320b second strap portion
321 first strap end
323 second strap end
324 overlap region or overlap point
325 loop in the overlap region
326 slot
327 pin
328 holes
400 thumb orthosis 410 molded body
412 second end portion
413 guiding element
413a holes of the guiding element
413b pin closure
420 strap
428 holes of the strap

The invention claimed is:

1. A thumb orthosis comprising:
a) a substantially dimensionally stable molded body bent in a U-shape, which in the applied state is fitable on a hand between a thumb of the hand and an index finger of the hand and supports the thumb and is operative to fix the thumb at a distance from the index finger, wherein the molded body bent in a U-shape has a first end portion and a second end portion; and
b) a strap fastened by one strap end to the first end portion of the molded body, the second end portion of the molded body comprising a guiding element for guiding the strap, the strap, as viewed from the first end portion in the applied state, guidable once around the wrist such that it overlaps itself at an overlap point, wherein two mutually overlapping strap portions are not rigidly connected to one another at the overlap point, and the strap is guided on the guiding element of the second end portion, and the end of the strap is reversibly fastenable to the strap.

2. The thumb orthosis according to claim 1, wherein the second end portion of the molded body has a turning element as the guiding element for turning the strap, wherein, as viewed from the first end portion, in the applied state, the strap is guided once around the wrist such that it intersects with itself at an intersection point as an overlap point defining two intersecting strap portions, wherein the two intersecting strap portions are not rigidly connected to one another at the intersection point, and the strap is turned at the turning element of the second end portion.

3. The thumb orthosis (according to claim 2, wherein the turning element on the second end portion of the molded body is formed as a notch in the second end portion.

4. The thumb orthosis according to claim 1, wherein the guiding element is formed as a loop for pulling the strap through.

5. The thumb orthosis according to claim 1, wherein the guiding element is reversibly fastenable to the strap via a pin closure, via a hook and loop fastener, or via a hook/eye closure.

6. The thumb orthosis according to claim 1, wherein the guiding element comprises a perforated strap and fixing element.

7. The thumb orthosis according to claim 2, wherein the overlap point is located in a defined overlap region.

8. The thumb orthosis according to claim 7, wherein the defined overlap region is formed as a loop on or in the strap, through which the strap is pulled, wherein the loop is arranged in the region of the strap which follows the first end portion of the molded body.

9. The thumb orthosis according to claim 8, wherein the loop forms a slot that is wider than the width of the strap.

10. The thumb orthosis according to claim 7, wherein the defined overlap region is designed as a hook-and-loop fastener.

11. The thumb orthosis according to claim 1, wherein the end of the strap is reversibly fastened to the strap via a pin closure, via a hook-and-loop fastener, or via a hook/eye closure.

12. The thumb orthosis according to claim 1, wherein the molded body and the strap are integrally formed.

13. The thumb orthosis according to claim 1, wherein the molded body is saddle-shaped and has air holes, and wherein the molded body consists of a shapeable material.

14. The thumb orthosis according to claim 1, wherein the thumb orthosis is operable to pull the thumb into a plane of a palm of the hand when worn on the hand.

15. A thumb orthosis comprising:
a substantially dimensionally stable moulded body bent in a U-shape, which in the applied state is fitable on a hand between a thumb of the hand and an index finger of the hand and supports the thumb and is operative to fix the thumb at a distance from an index finger;
wherein the moulded body bent in a U-shape has a first end portion and a second end portion, and a strap fastened by one strap end to the first end portion of the moulded body;
the second end portion of the moulded body comprising a guiding element for guiding the strap;
the strap, as viewed from the first end portion in the applied state, being guideable once around the wrist such that it intersects with itself at an intersection point to form two non-parallel portions of the strap; and
wherein the strap is guided on the guiding element of the second end portion, and the end of the strap is reversibly fastenable to the strap, and wherein the guiding element is formed as a perforated strap and fixing element.

* * * * *